Nov. 25, 1941.   T. O. SCHRADER, JR   2,264,248
APPARATUS FOR PURIFYING STEAM FROM STEAM GENERATORS
Filed Aug. 23, 1938    2 Sheets-Sheet 1

Thomas O. Schrader Jr.
INVENTOR.
BY
ATTORNEYS.

Nov. 25, 1941.    T. O. SCHRADER, JR    2,264,248
APPARATUS FOR PURIFYING STEAM FROM STEAM GENERATORS
Filed Aug. 23, 1938    2 Sheets-Sheet 2
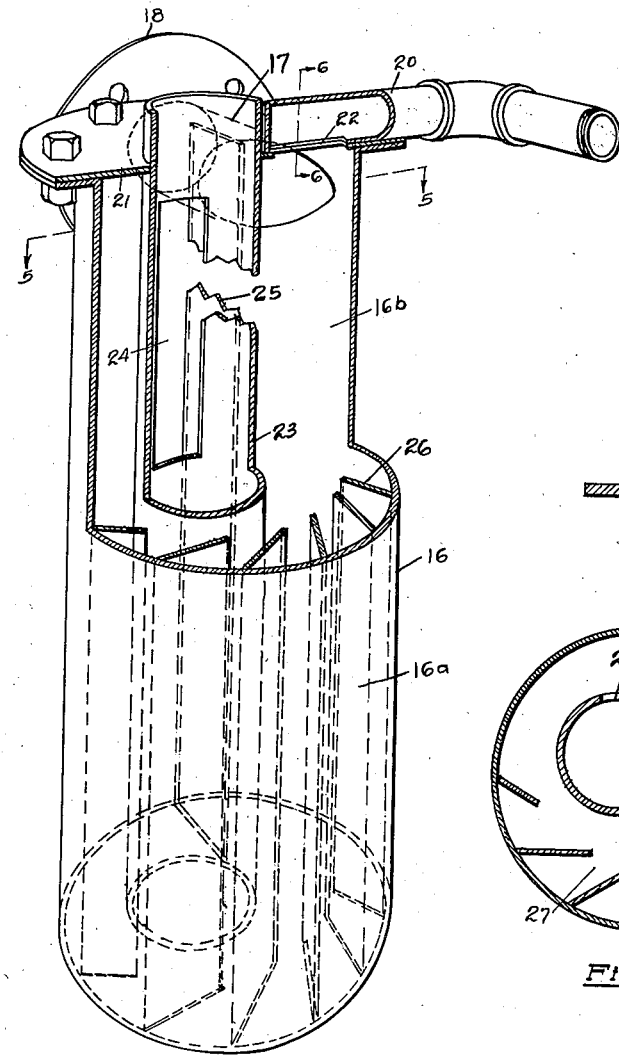
Fig.4.
Fig.5.
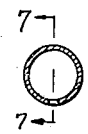
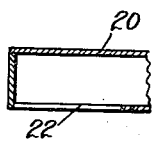
Fig.6.    Fig.7.
Thomas O. Schrader Jr
INVENTOR
BY
ATTORNEYS.

Patented Nov. 25, 1941

2,264,248

UNITED STATES PATENT OFFICE 2,264,248

APPARATUS FOR PURIFYING STEAM FROM STEAM GENERATORS

Thomas O. Schrader, Jr., Pittsburgh, Pa., assignor to Erie City Iron Works, Erie, Pa., a corporation of Pennsylvania Application August 23, 1938, Serial No. 226,287

3 Claims. (Cl. 122—491)

The invention herein is exemplified as a purifier for feed water for steam boilers.

Steam as generated in the boiler carries with it a small amount of moisture which is entrained with the steam. The particles of boiler water together with any foreign substances that may be suspended in the steam are picked up through the introduction of clean feed water and removed from the steam.

In carrying out the invention, purifiers are mounted in the boiler, as shown in a steam drum of a water tube boiler, preferably in multiples so as to be interchangeable and are so arranged that they may be readily serviced. Features and details of the invention will appear from the specification and claims.

Figure 1:
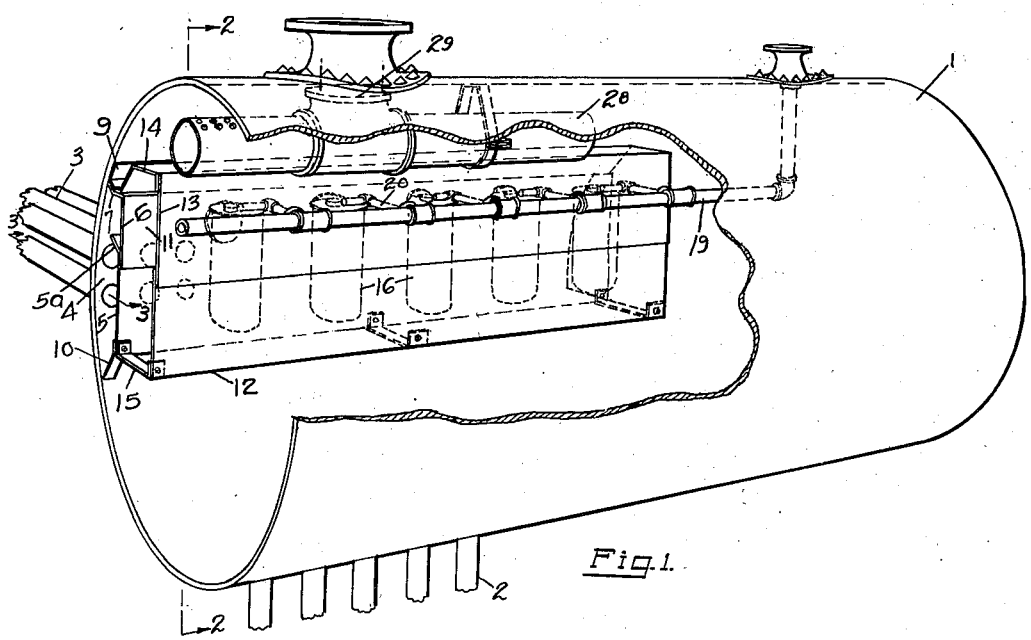

A preferred embodiment of the apparatus and the method by which the invention may be practiced is illustrated in the accompanying drawings as follows:

Fig. 1 shows a perspective view, partly in section and with parts broken away, of a steam drum of a water tube boiler.

Figure 2:
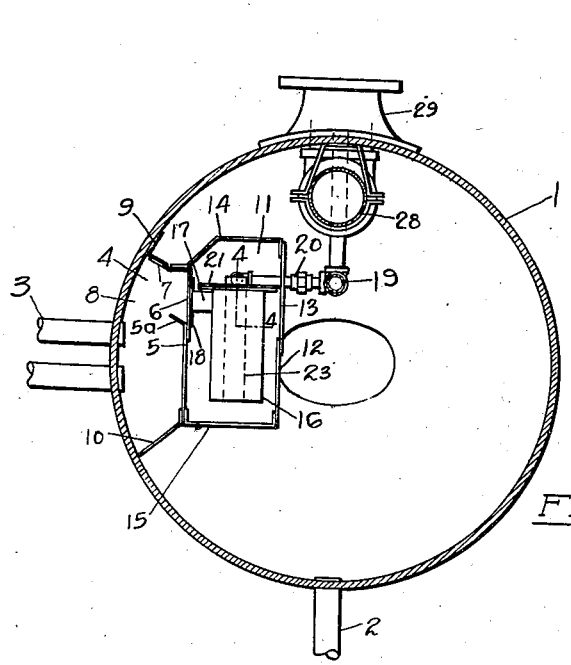

Fig. 2 a section on the line 2—2 in Fig. 1.

Figure 3:
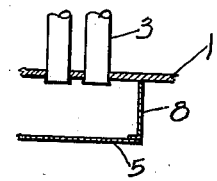

Fig. 3 a section on the line 3—3 in Fig. 1.

Fig. 4 a perspective view partly cut away and in section of one purifier unit.

Fig. 5 a section on the line 5—5 in Fig. 4.

Fig. 6 a section on the line 6—6 in Fig. 4.

Fig. 7 a section on the line 7—7 in Fig. 6.

1 marks the drum, 2 down tubes from the steam drum, and 3 steam tubes leading to the drum.

The steam tubes lead to a chamber 4 open at the bottom and closed at the ends. One wall of the chamber is formed by the wall of the drum, the opposite wall of the chamber by plates 5 and 6, the top wall of the chamber by a plate 7 in the form of a flange on the plate 6 and the chamber has end plates 8. The plate 7 is secured by angle 9 to the wall of the drum and the plate 5 by brackets 10 to the wall of the drum. The lower end of the chamber is below the normal water level.

A chamber 11 is arranged in front of the chamber 4. One wall of this chamber is formed by the plates 5 and 6 and the opposite wall by the plates 12 and 13. It is provided with a top plate 14 and is open at its ends and bottom. The plates 12 and 13 are held in position by bars 15 which fasten to the bottom part of the chamber 4 providing a unit that may be removable so as to more readily expose and provide for servicing the purifying units.

Purifying units 16 are arranged in multiple, each being identical. Each unit includes a surrounding cylinder 16a forming a chamber 16b. It is supported by a steam intake pipe 17 which extends at a tangent from the cylinder 16a and terminates in an opening through the wall of the cylinder leading to the chamber 16b. The pipe 17 is provided with a flange 18 and this flange secures the pipe 17 in register with an opening through the plate 6. A splash baffle 5a is formed on the upper end of the plate 5 immediately below the openings to the pipe 17. A feed water manifold 19 leads across the drum and is provided with a branch 20 for each purifying unit. The end of the branch is secured on a top 21 on the cylinder 16a. The end of the branch 20 is closed, but is provided with a slot 22 registering with a similar slot in the top 21. With this structure water is delivered in a sheet downwardly into the chamber 16b and directly in front of the incoming steam entering through the pipe 17.

An outlet tube 23 is arranged in the cylinder 16. It is slightly off-set from the center and communicates with the chamber 16b through a slot 24. The off-setting gives a wider space and a wider sheet of incoming water and a greater space permitting the introduction of the baffles with free circulating space in a smaller instrument. The bottom of this tube is open as is the bottom of the cylinder 16, the bottom of both being below the normal water level.

The top of the tube is open to the chamber 11. A dividing plate 25 extends from the tube 23 to the wall of the cylinder 16 at the side of the opening from the pipe 17 and in line with the inner wall of that opening. This compels the incoming steam to travel around the space between the two tubes in reaching the slot 24. A series of baffles 26 extends from bottom to top of the cylinder 16, these baffles being inclined toward the inlet of the steam. Their width is such as to leave a free space 27 between their inner edges and the tube 23.

It will readily be seen that the steam entering by the tube 17 and having a velocity induced by the discharge is made to pick up and atomize the sheet of feed water delivered through the slot 22. The centrifugal force due to the circular movement of the steam throws the feed water and that liquid taken up from the steam on to the wall of the cylinder 16a and the separating plates 26 and maintains a film of water over these plates, thus washing them and preventing an accumulation of soluble solids. The liquid flow down the plates and the walls of the cylinder reaches the main body of the water of the boiler. The intimate contact of the steam with the sheet of liquid and the atomizing of that liquid through the action of the steam provides such intimate contact as to wash the steam and purify it.

The steam passes from the purifiers into the chamber 11, follows the chamber to the ends thereof and is delivered to the upper space of the drum. In traversing the chamber 11 the movement is comparatively slow and opportunity is given for the separation, through gravity, of any remaining liquid that may be entrained in the steam. The steam passes from the ends of the chamber 11, is reversed and enters the dry pipe 28 from which it leads to a discharge 29 of the drum.

What I claim as new is:

1. In an apparatus for purifying steam from a steam generator, the combination of a steam and water chamber; an inlet manifold in the chamber open at the bottom; a series of purifying units open at their bottoms connected with the manifold; an auxiliary chamber in which the units are placed, said units discharging the steam to said auxiliary chamber and the units discharging liquids and impurities from the bottoms of the units, said auxiliary chamber having a steam discharge to the steam and water chamber; and devices discharging cleansing liquid across the path of the steam in the units.

2. In an apparatus for purifying steam from a steam generator, the combination of a steam and water chamber; an inlet manifold in the chamber open at the bottom; a series of purifying units open at their bottoms connected with the manifold; an auxiliary chamber in which the units are placed open at the bottom and ends, to the upper part of which steam from the units discharges and the open bottom of which provides for the discharge of liquids and impurities from the bottoms of the units; and devices discharging cleansing liquid across the path of the steam in the units.

3. In an apparatus for purifying steam from a steam generator, the combination of a steam and water chamber; a steam inlet manifold in the steam and water chamber; a series of purifying units connected with the manifold; means delivering feed water across the path of the moving steam as it is introduced to the units; and means forming a chamber in which the units are placed to which the units discharge the steam and water from the units, said chamber having a part of such size and so removable as to provide for removal of the units from the chamber.

THOMAS O. SCHRADER, Jr.